(12) United States Patent
Smith et al.

(10) Patent No.: US 6,466,235 B1
(45) Date of Patent: Oct. 15, 2002

(54) METHOD AND APPARATUS FOR INTERACTIVELY AND AUTOMATICALLY SELECTING, CONTROLLING AND DISPLAYING PARAMETERS FOR AN AVIONICS ELECTRONIC FLIGHT DISPLAY SYSTEM

(75) Inventors: Matthew T. Smith, Marion; Gary L. Owen, Robins, both of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/391,777

(22) Filed: Sep. 8, 1999

(51) Int. Cl.$^7$ .................................................. G06F 3/00
(52) U.S. Cl. ........................ 345/771; 345/856; 345/810; 345/808; 345/809; 701/3; 701/14; 701/4
(58) Field of Search ................................. 345/856, 157, 345/160, 771, 810, 808, 809, 792, 798, 788, 799, 800, 975; 701/3, 14, 4

(56) References Cited

U.S. PATENT DOCUMENTS

| | | | | |
|---|---|---|---|---|
| 5,668,542 | A | * | 9/1997 | Wright .................... 340/971 |
| 6,112,141 | A | * | 8/2000 | Briffe et al. ............... 701/14 |
| 6,150,959 | A | * | 11/2000 | Germanetti ................ 340/971 |
| 6,259,975 | B1 | * | 7/2001 | Rollet et al. .................. 701/3 |

* cited by examiner

Primary Examiner—Kristine Kincaid
Assistant Examiner—Mylinh Tran
(74) Attorney, Agent, or Firm—Nathan O. Jensen; Kyle Eppele (57) ABSTRACT

An apparatus and method for displaying flight information on a multi-functional avionics display where the display is divided into quadrants and a pop-up menu of available instrument functions to be displayed is provided within and for each of the quadrants, and the size of the display of the instrument functions is dynamically changed in response to manual and automatic stimuli.

19 Claims, 10 Drawing Sheets

METHOD AND APPARATUS FOR INTERACTIVELY AND AUTOMATICALLY SELECTING, CONTROLLING AND DISPLAYING PARAMETERS FOR AN AVIONICS ELECTRONIC FLIGHT DISPLAY SYSTEM

CROSS REFERENCE TO RELATED PATENT APPLICATIONS

This application is related to the below listed co-pending patent applications which are filed on even date herewith, are assigned to the same assignee, and are incorporated herein in their entirety by these references:

An application entitled "Method and Apparatus For Interactively Selecting Display Parameters For An Avionics Flight Display" by Sarah Barber, Norm W. Arons, and George W. Palmer;

An application entitled "Method and Apparatus For Interactively Selecting, Controlling and Displaying Parameters For An Avionics Radio Tuning Unit" by George W. Palmer, Claude Eyssautier, and Matt Smith;

An application entitled "Method and Apparatus For Interactively Displaying A Route Window For A Flight Management System" by Gary L. Owen, Sarah Barber, and George W. Palmer; and An application entitled "Method and Apparatus For Graphically Inserting Waypoints For A Flight Management System" by Martin Pauly.

FIELD OF THE INVENTION

The present invention generally relates to avionics, and more particularly relates to avionics display systems, and even more particularly relates to multi-functional electronic flight display systems.

BACKGROUND OF THE INVENTION

In the past, designers of avionics displays and flight deck electronic navigation, control and communication systems have endeavored to achieve a reduction in pilot workload. One area of concern has been the control of new large-sized multi-functional displays (MFDs), which typically requires a significant amount of "heads-down" time. This "heads-down" time occurs when the pilot is neither looking at the primary flight displays, nor out the wind screen, but instead is focused upon a task in an oblique direction, such as when manually controlling the information content of these MFDs via a separate controller, which may or may not be co-located with the MFDs and may have an integrated keypad or tuning knob console. Another approach has been proposed in which MFDs are segmented into smaller viewing areas and are controlled via a single pop-up, cursor-driven menu in the center of the MFD. The pilot can select from several predetermined options. Depending on the predetermined size of each instrument function to be displayed, earlier selected functions may be either removed from the view, and/or shifted to a new position on the MFD. While these alternate means of controlling MFDs have clear advantages, they also have significant drawbacks.

During times of moderate and severe turbulence, otherwise very simple tasks can become too difficult and too time consuming. For example, the step of requiring a pilot to look for or mentally keep track of the shifting location of each previously displayed instrument function is undesirable. Requiring the pilot's attention to be diverted to a side-mounted display to operate a separate controller may also be undesirable in certain circumstances. In general, during take-off and approach, the workload on a pilot can already be extreme, leaving the pilot with little or no time to spare. Any additional effort, at an already busy time, is quite undesirable.

Consequently, there exists a need for improved methods and apparatuses for effecting the operation of electronic flight instruments in an aircraft which overcome some of these shortcomings.

SUMMARY OF THE INVENTION

It is an object of the present invention to provide an improved avionics electronic flight display system.

It is a feature of the present invention to include a segmented forward-mounted multi-functional display with enhanced menu display capabilities, including localized pop-up menus which appear in each segment upon clicking in such segment.

It is another feature of the present invention to include a graphical user interface which allows for automatic vertical expansion/compression of a segment of an electronic flight instrument display.

It is yet another feature of the present invention to include a manual expansion/compression feature.

It is still yet another feature of the present invention to include automatic presentation of a one-click toggle feature, for linking to a hidden page, when an expanded display segment is compressed.

It is even another feature of the present invention to include a feature to prohibit simultaneously displaying the same instrument in two or more display segments.

It is an advantage of the present invention to reduce pilot workload.

It is another advantage of the present invention to enhance pilot situational awareness.

The present invention is an apparatus and method for selecting, controlling and displaying parameters for an avionics electronic flight display system, which is designed to satisfy the aforementioned needs, provide the previously stated objects, include the above-listed features, and achieve the already articulated advantages. The present invention is carried out in a "heads down-less" manner in a sense that the undesirable requirement for the pilot's attention to be diverted from the primary flight displays is reduced.

Accordingly, the present invention is an avionics multi-functional display with enhanced menuing capabilities and operating in innovative ways so as to reduce pilot "heads-down" time.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
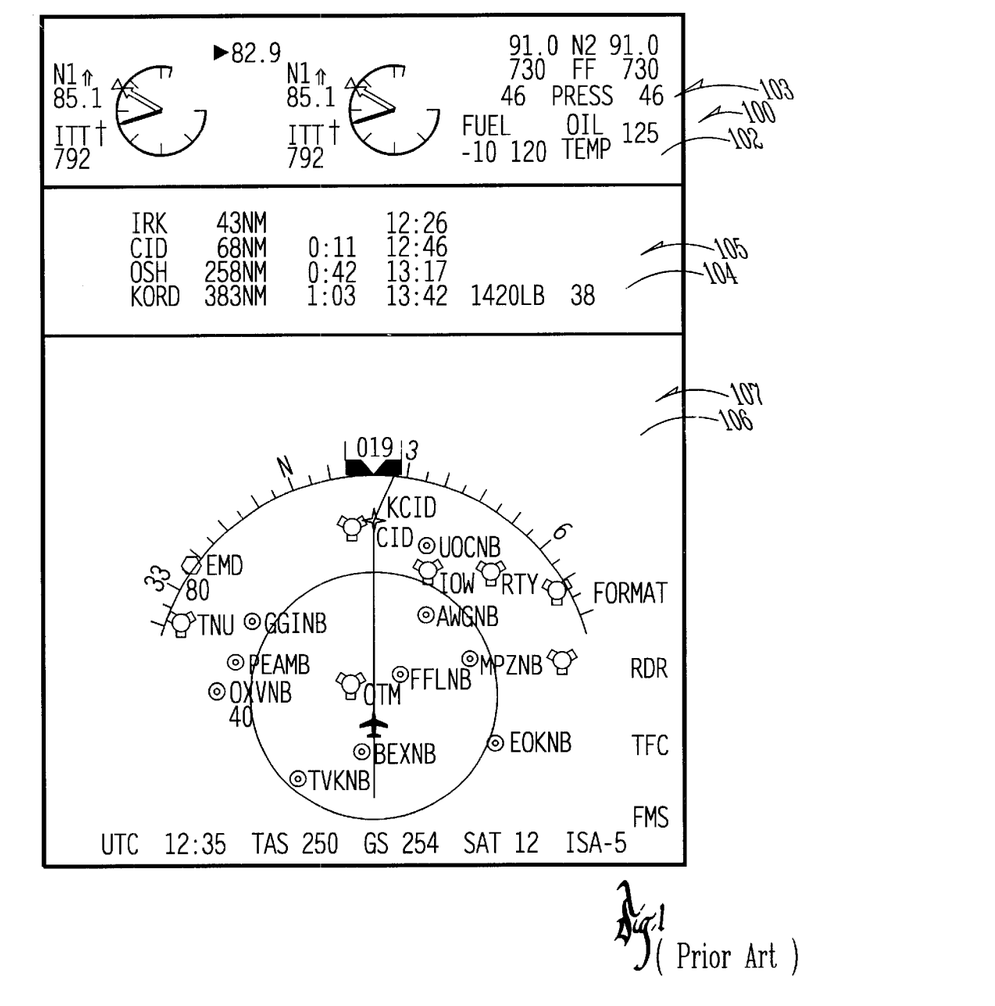
FIG. 1 is a representation of a prior art multi-functional display.

Now referring to the drawings wherein like numerals refer to like matter throughout, there is shown in FIG. 1 a display of the prior art, generally designated 100, having a portrait orientation with the longest dimension extending vertically. Display 100 includes a first selected instrument function 102, displayed in a top display section 103, a second selected instrument function 104 displayed in a second display section 105. In other embodiments, three display sections were included. If the pilot desires a different instrument function to be shown, he clicks his menu button and selects the new instrument function to be displayed. In such situations, the first selected instrument function 102 is removed, and the second instrument functions 104 is shifted upward into the top display section 103. This makes room for a newly selected instrument function to be displayed in the second display section 105. With this approach, it is clear that the pilot must reorient as to where to look for each instrument function each time any new instrument function is added. This requirement to reorient becomes even more troublesome when the number of display sections is increased.

Figure 2:
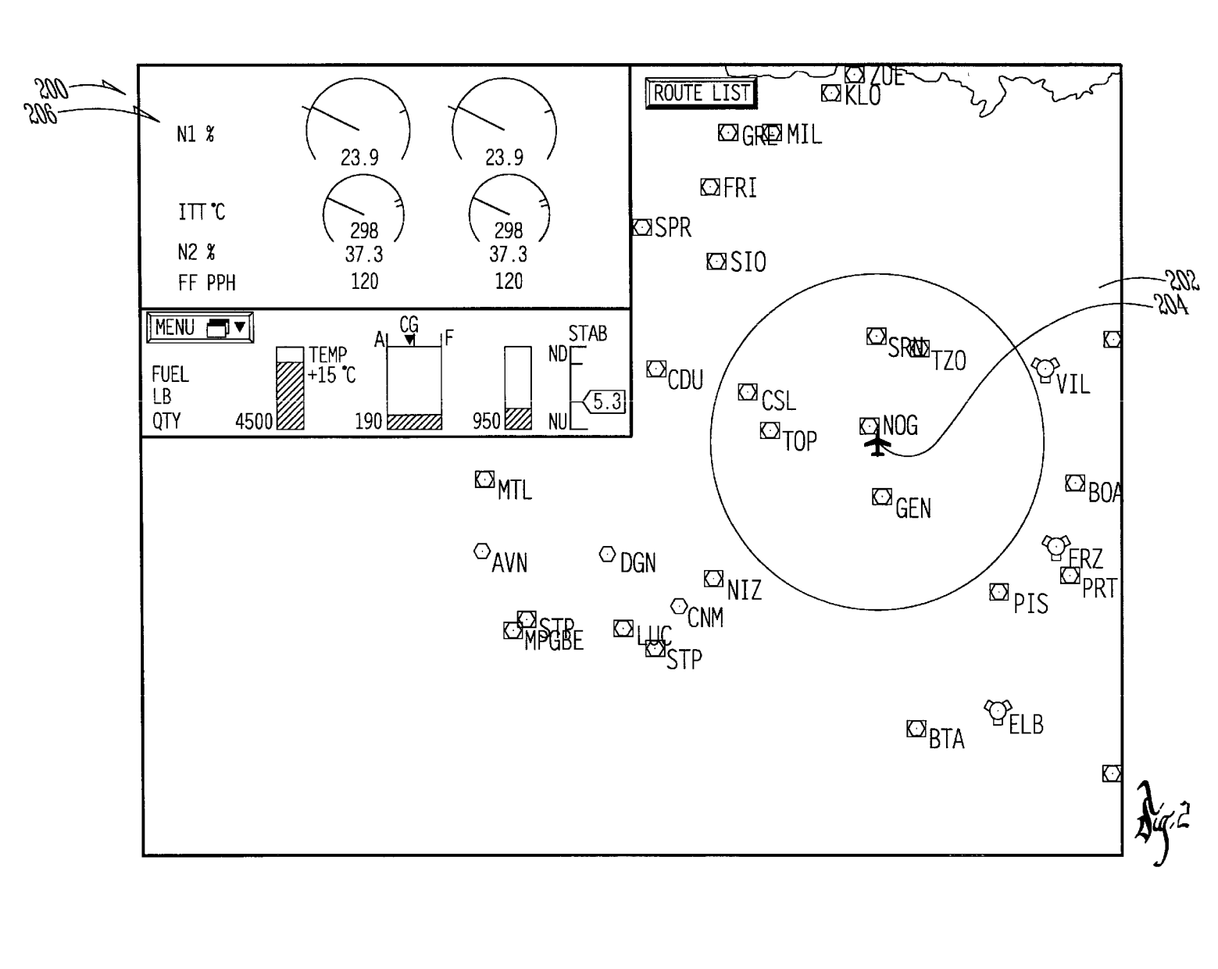
FIG. 2 is a representation of an avionics display of the present invention, showing the display partitioned with a segment in the upper left-hand corner.

Now referring to FIG. 2, there is shown a landscape display of the present invention, generally designated 200, having an electronic moving map 202 with a reference aircraft 204 therein. A landscape orientation is shown because it is believed to have beneficial aspects; however, portrait orientations, as well as square and other display geometries, are also contemplated. Also shown in the upper left-hand quadrant of display 200 is engine instrument function window 206. The electronic moving map 202 is the default background display function as was done in prior art MFDs. If the pilot desires additional instrument functions to be displayed, then he must change the display to better meet his desires.

Figure 3:
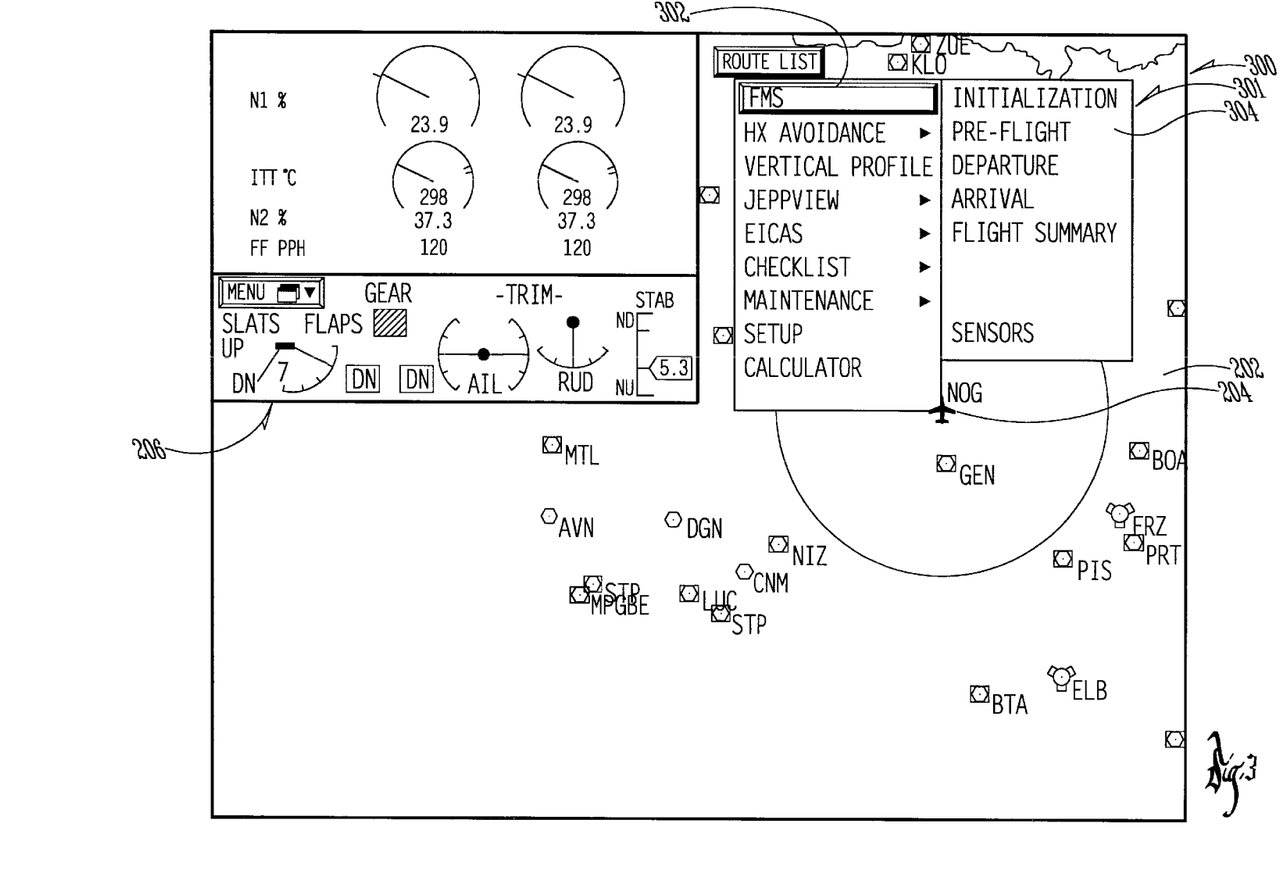
FIG. 3 is a representation of an avionics display of the present invention, showing the display partitioned with a segment in the upper left-hand corner and a pop-up menu in the upper right-hand corner.

Now referring to FIG. 3, there is shown a display, generally designated 300, of FIG. 2, after the pilot has clicked in the upper right-hand quadrant to reveal an upper right-hand quadrant pop-up menu 301, having an upper right-hand quadrant pop-up instrument function menu 302 and a upper right-hand quadrant pop-up detail menu 304. The pilot then can select one of these available instrument functions on the upper right-hand quadrant pop-up instrument function menu 302 and further select one of the available detailed items on upper right-hand quadrant pop-up detail menu 304. As an example, the available FMS window selections are currently displayed in FIG. 3 with FMS highlighted or boxed in menu 302 and the FMS selection options shown in detail menu 304. If the pilot wishes to see what is available for viewing In the lower right-hand quadrant of display 200, he could click there.

Figure 4:
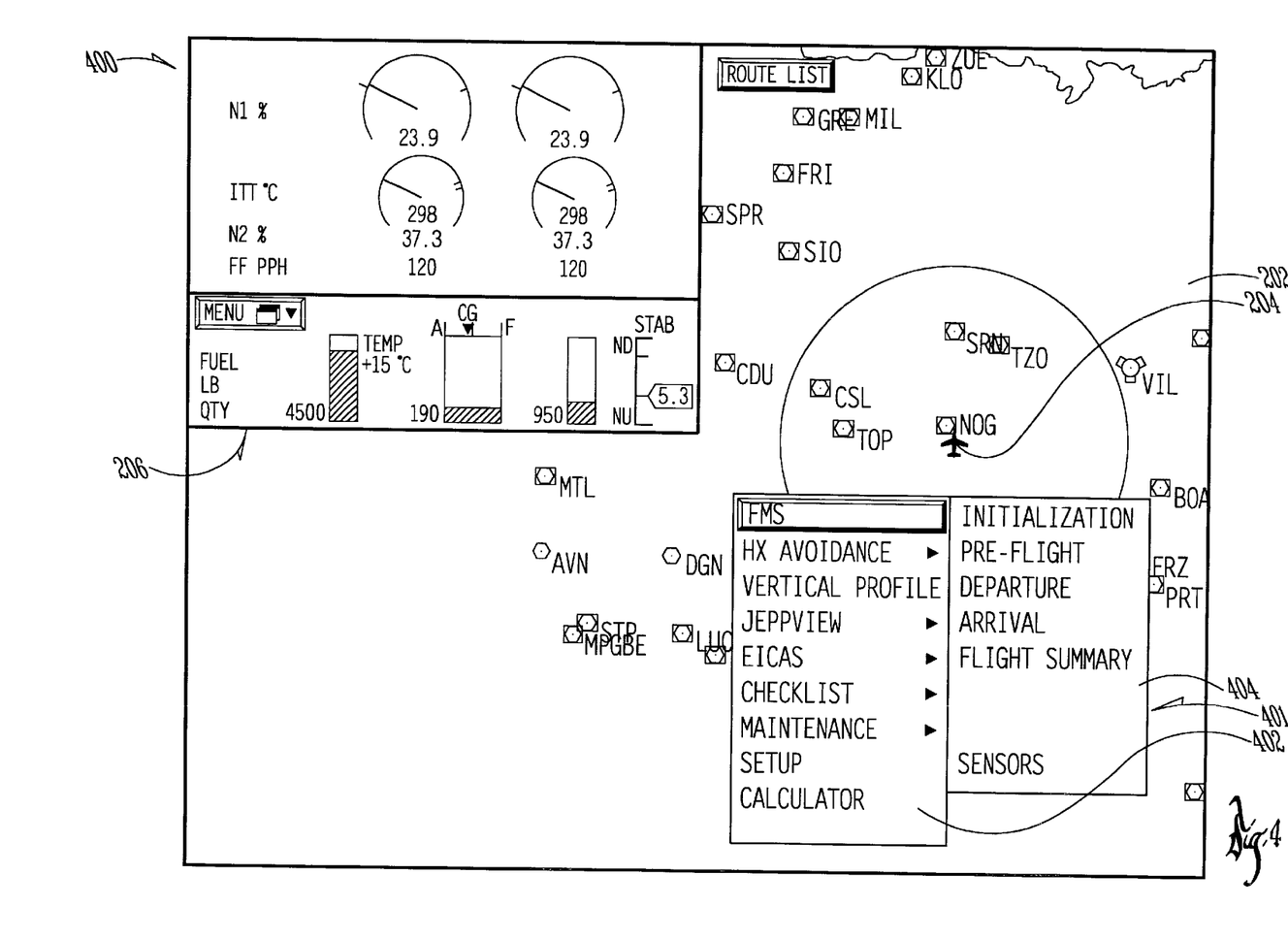
FIG. 4 is a representation of an avionics display of the present invention, showing the display partitioned with a segment in the upper left-hand corner and a pop-up menu in the lower right-hand corner.

Now referring to FIG. 4, there is shown a display, generally designated 400, of FIG. 2, after the pilot has clicked in the lower right-hand quadrant to reveal a lower right-hand quadrant pop-up menu 401, having a lower right-hand quadrant pop-up instrument function menu 402 and a lower right-hand quadrant pop-up detail menu 404. Note that the available options in the upper right-hand quadrant pop-up menu 301 and lower right-hand quadrant pop-up menu 401 are the same other than their location on the display 200. If the pilot wishes to display a particular instrument function, then he need only make the appropriate selection from the upper right-hand quadrant pop-up menu 301 or the lower right-hand quadrant pop-up menu 401. In FIG. 4 FMS is again shown highlighted as an example.

Figure 5:
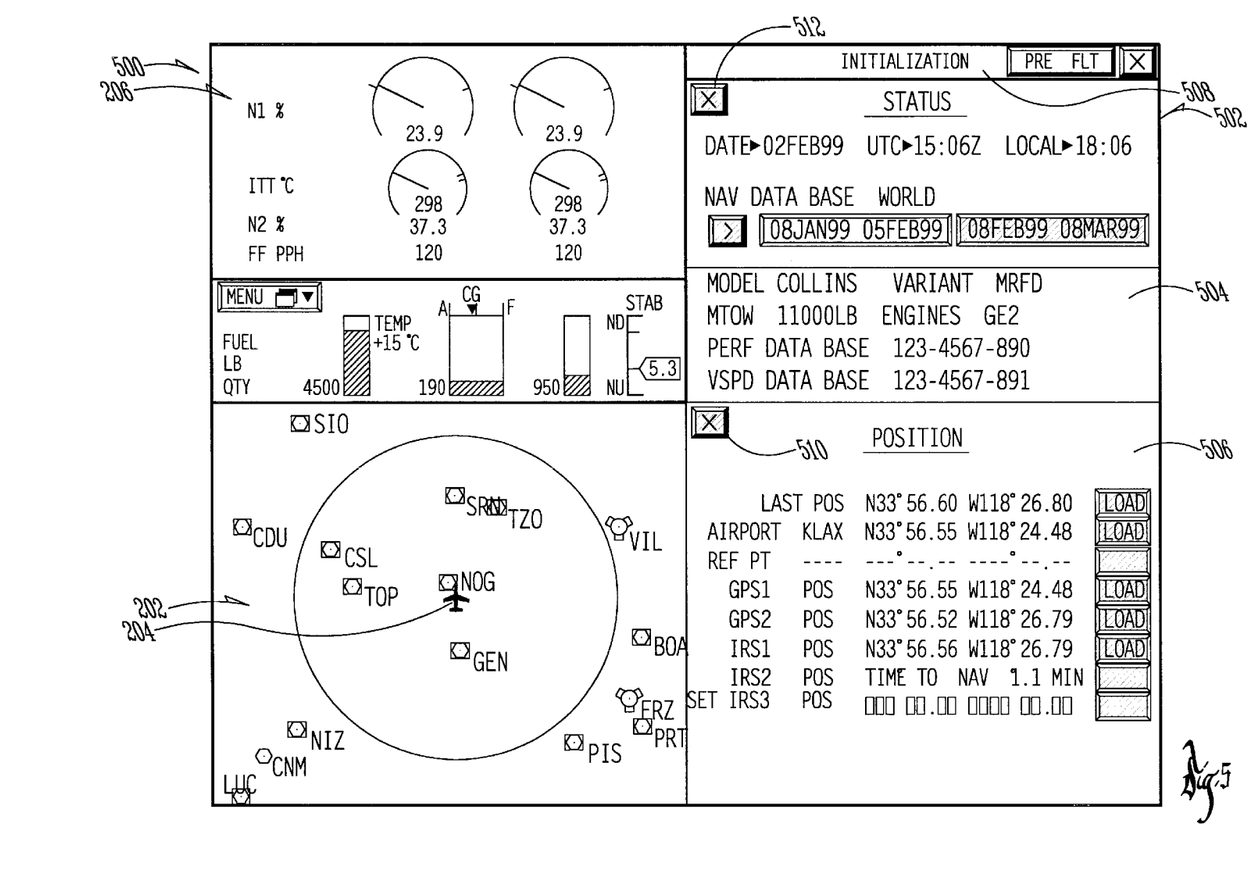
FIG. 5 is a representation of an avionics display of the present invention, showing the display partitioned with a segment in the upper left-hand corner and another segment in both the lower and the upper right-hand corners.

Now referring to FIG. 5, there is shown a display generally designated 500, of FIG. 2, after a pilot has made a selection from either upper right-hand quadrant pop-up detail menu 304 or lower right-hand quadrant pop-up detail menu 404. In FIG. 5 the FMS initialization function of FIG. 3 is shown selected by selecting INITIALIZATION in menu 304. The present invention automatically displays the selected FMS initialization function in full view at right-hand half side 502. Depending upon the instrument function selected and its predetermined default display features, the display of that selected function would have a full vertical expansion or a single quadrant display. The FMS initialization function has default display feature such that it will occupy both top and bottom quadrants if either quadrant is selected, and the other quadrant is not currently displaying an instrument function other than the default moving map 202. Display 500 shows an FMS initialization full view top menu bar 508, without any double chevron expansion buttons thereon, because the view is fully expanded. However, display 500 does include an FMS initialization full view, bottom section, manual view compression button 510, which could be used to close down the display in the bottom right hand quadrant if so desired. Similarly, an FMS initialization full view, top section, manual view compression button 512 is included to allow for dosing of the upper right-hand quadrant.

Figure 6:
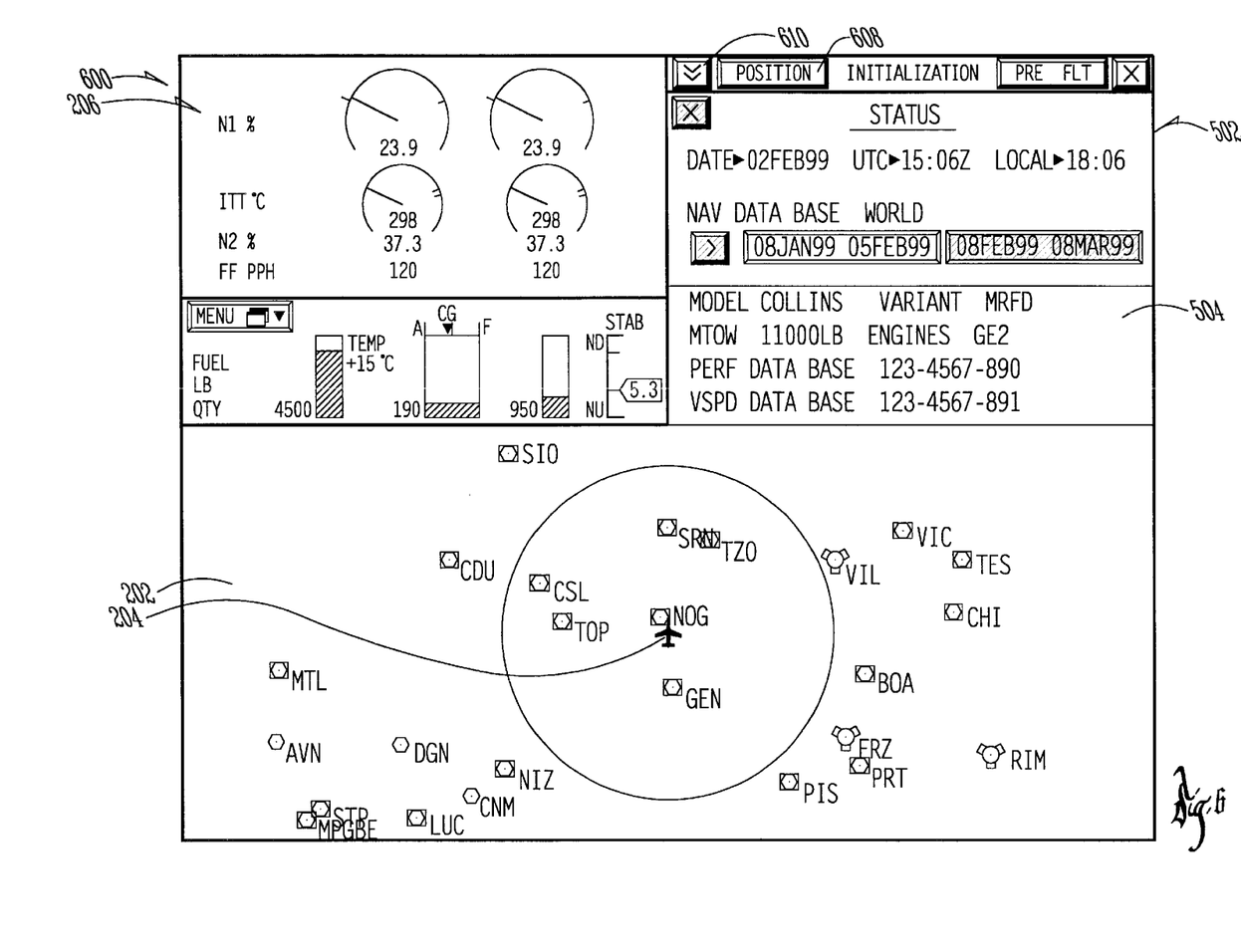
FIG. 6 is a representation of an avionics display of the present invention, showing the display of FIG. 5 after compressing the segment in the lower right-hand corner.

Now referring to FIG. 6, there is shown a display, generally designated 600, of FIG. 5 after FMS initialization full view, bottom section, manual view compression button 510 was clicked. When this happens, the electronic moving map 202 expands horizontally into the newly evacuated segment at the lower right hand quadrant. The display in the upper right-hand quadrant includes FMS initialization status function 504, but also has been automatically adjusted to account for the compression from full view. FMS initialization, compressed view, position page button 608 is now automatically displayed to allow easy accessibility to the now concealed position page 506. This FMS initialization, compressed view, position page button 608, when clicked, will result in toggling between the available position 506 and status pages 504. Clicking FMS initialization, compressed view, top section, manual view expansion button 610 will result in a manual expansion of the FMS initialization function to the full vertical view 502 as is shown in FIG. 5.

Figure 7:
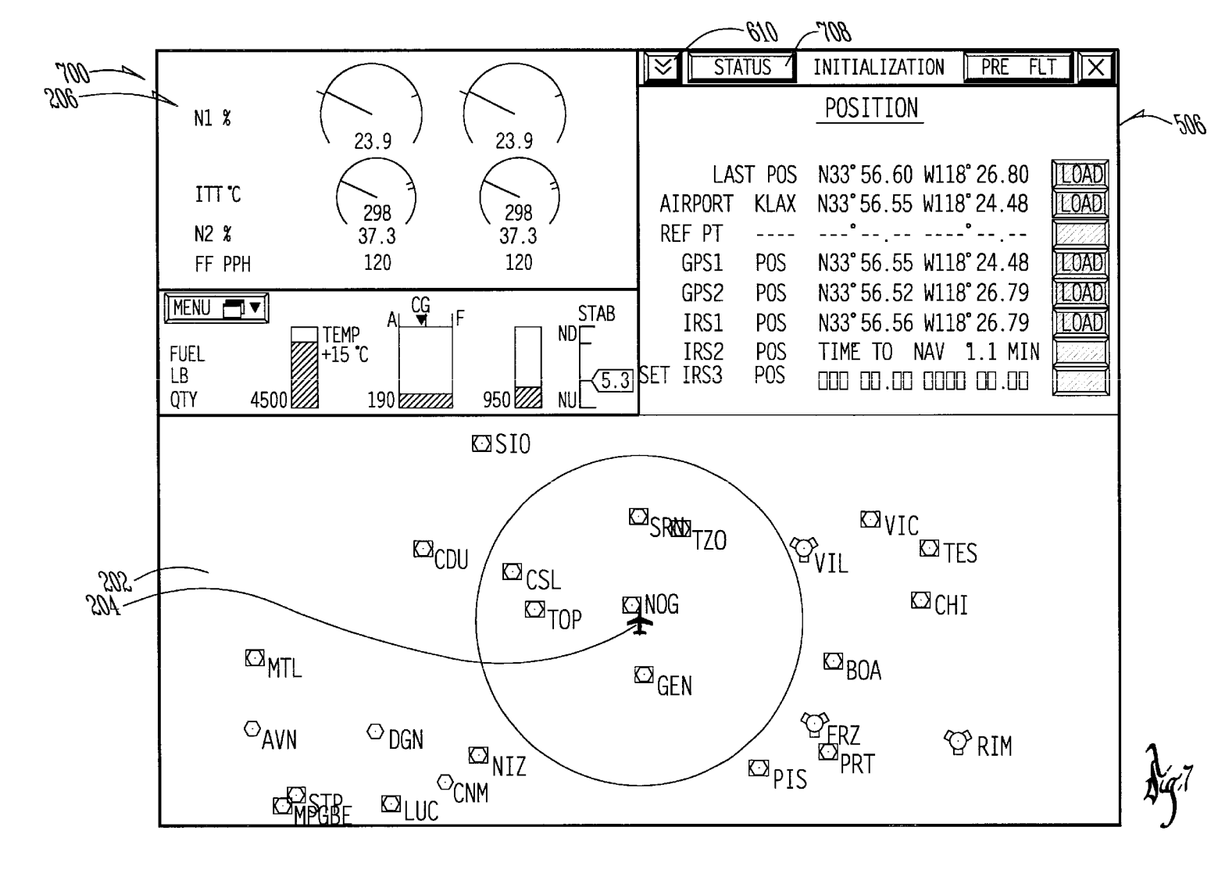
FIG. 7 is a representation of an avionics display of the present invention, showing the display of FIG. 6 after toggling the segment in the upper right-hand corner.

Now referring to FIG. 7, there is shown a display, generally designated 700, of FIG. 6 if the FMS initialization, compressed view, position page button 608 has been clicked. Now an FMS initialization, compressed view, status page button 708 is shown to allow access back to the status page 504.

Figure 8:
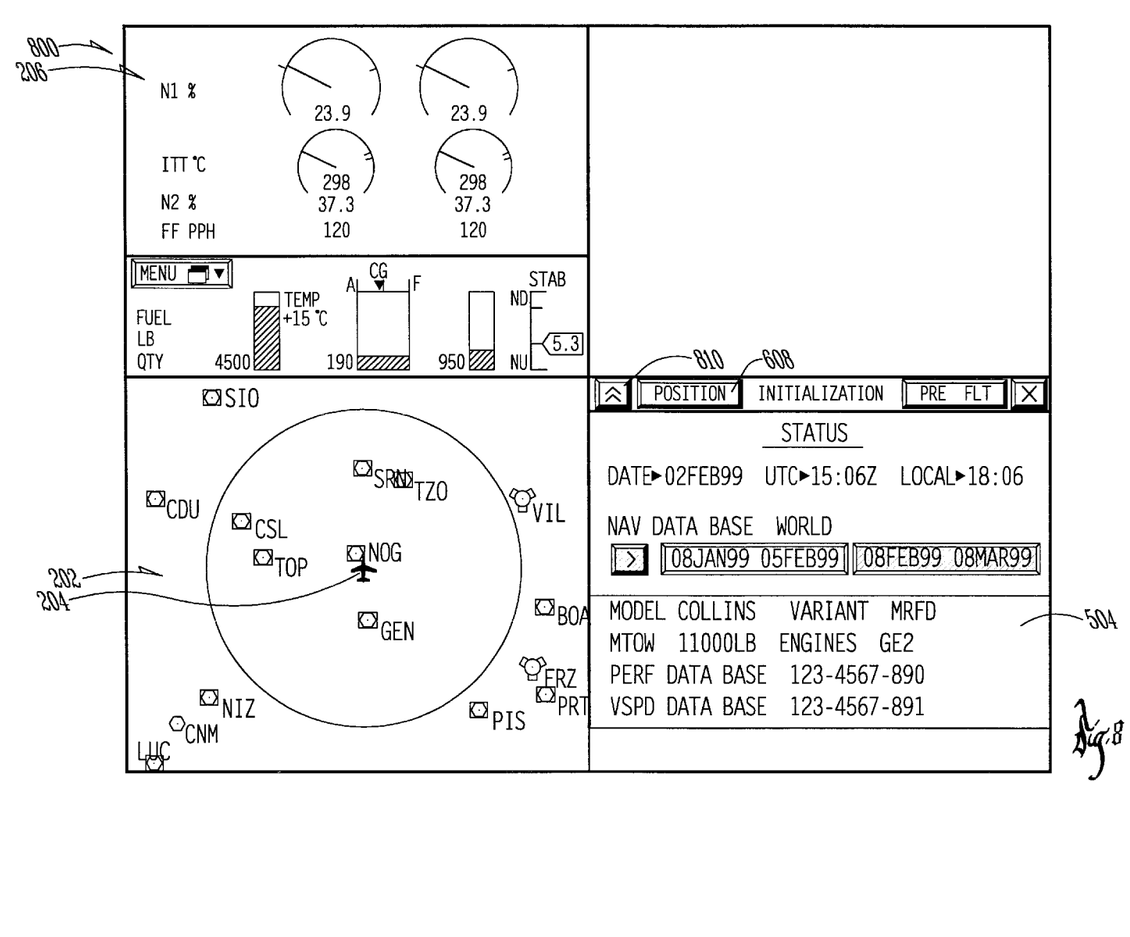
FIG. 8 is a representation of an avionics display of the present invention, showing the display of FIG. 5 after compressing the segment in the upper right-hand corner.

Now referring to FIG. 8, there is shown a display generally designated 800, of FIG. 5 after the FMS initialization window was resized by clicking FMS initialization full view, top section, manual view compression button 512. An FMS initialization, compressed view, bottom section, manual view expansion button 810 is included for allowing manual expansion into the now unoccupied upper right-hand quadrant. Note that the electronic moving map 202 is not shown in the upper right-hand quadrant, despite its nature as the default view because it is believed that a discontinuous electronic moving map 202 would be less desirable than a smaller electronic moving map 202. If the pilot wished to show additional instrument functions, he need only make the appropriate selections.

Figure 9:
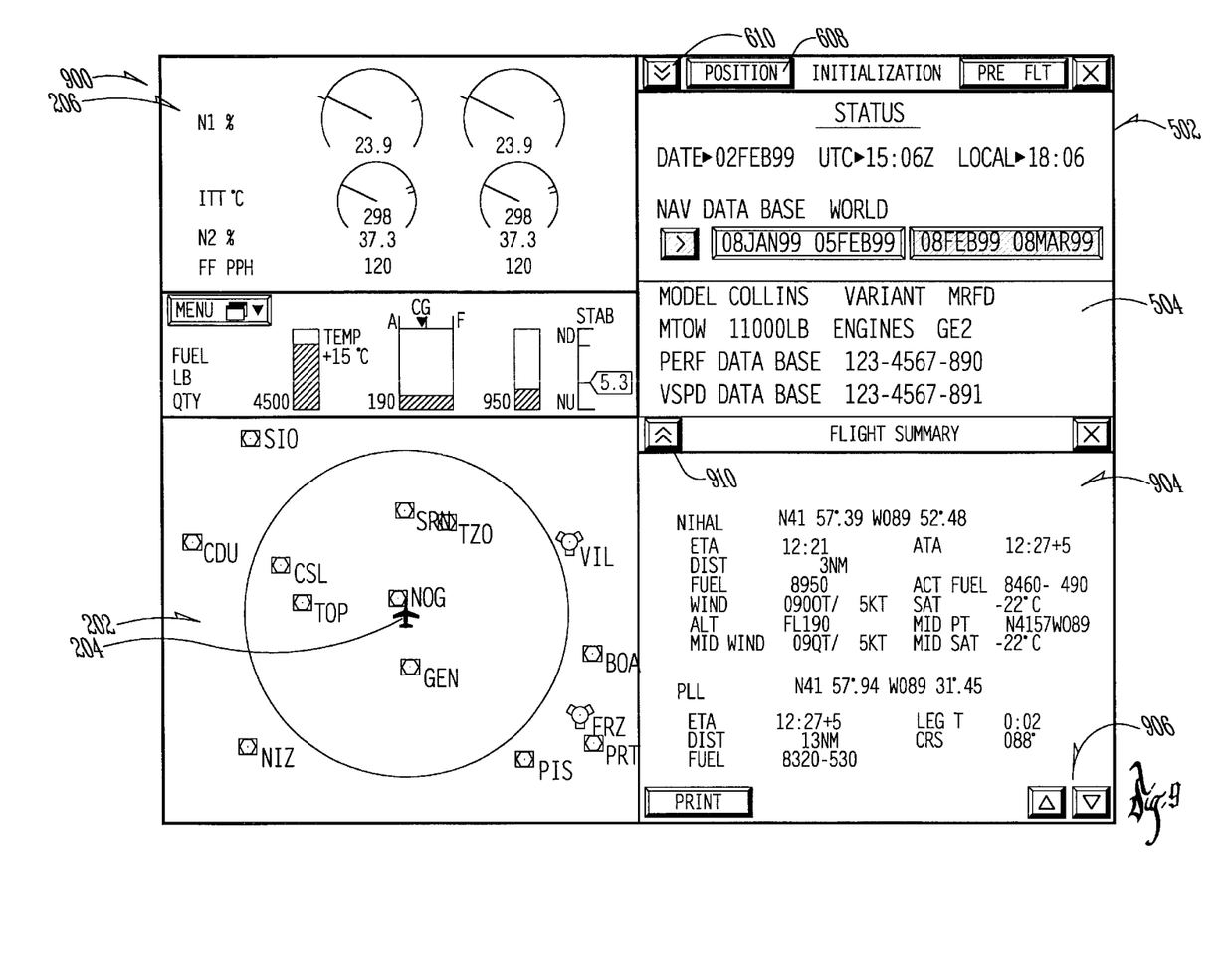
FIG. 9 is a representation of an avionics display of the present invention, showing the display of FIG. 5 after selecting a new segment in the lower right-hand corner and automatically compressing the previous segment in the lower right-hand corner.

Now referring to FIG. 9, there is shown a display generally designated 900, of FIG. 5 after the pilot clicked in the lower right-hand quadrant to reveal a pop-up menu, of FIG. 4 for the lower right hand-quadrant and further after making a selection of the FMS flight summary function in the pop-up detail menu 404. This results in automatic compression of the FMS initialization full view to display only the top section as in FIG. 6. Display 900 shows a flight summary function 904, a flight summary, compressed view, flight plan leg information scroll buttons 906 and a flight summary, compressed view, bottom section, manual view expansion button 910. If the pilot then desires to see more flight summary information at the same time, he would only need to make the appropriate selection.

Figure 10:
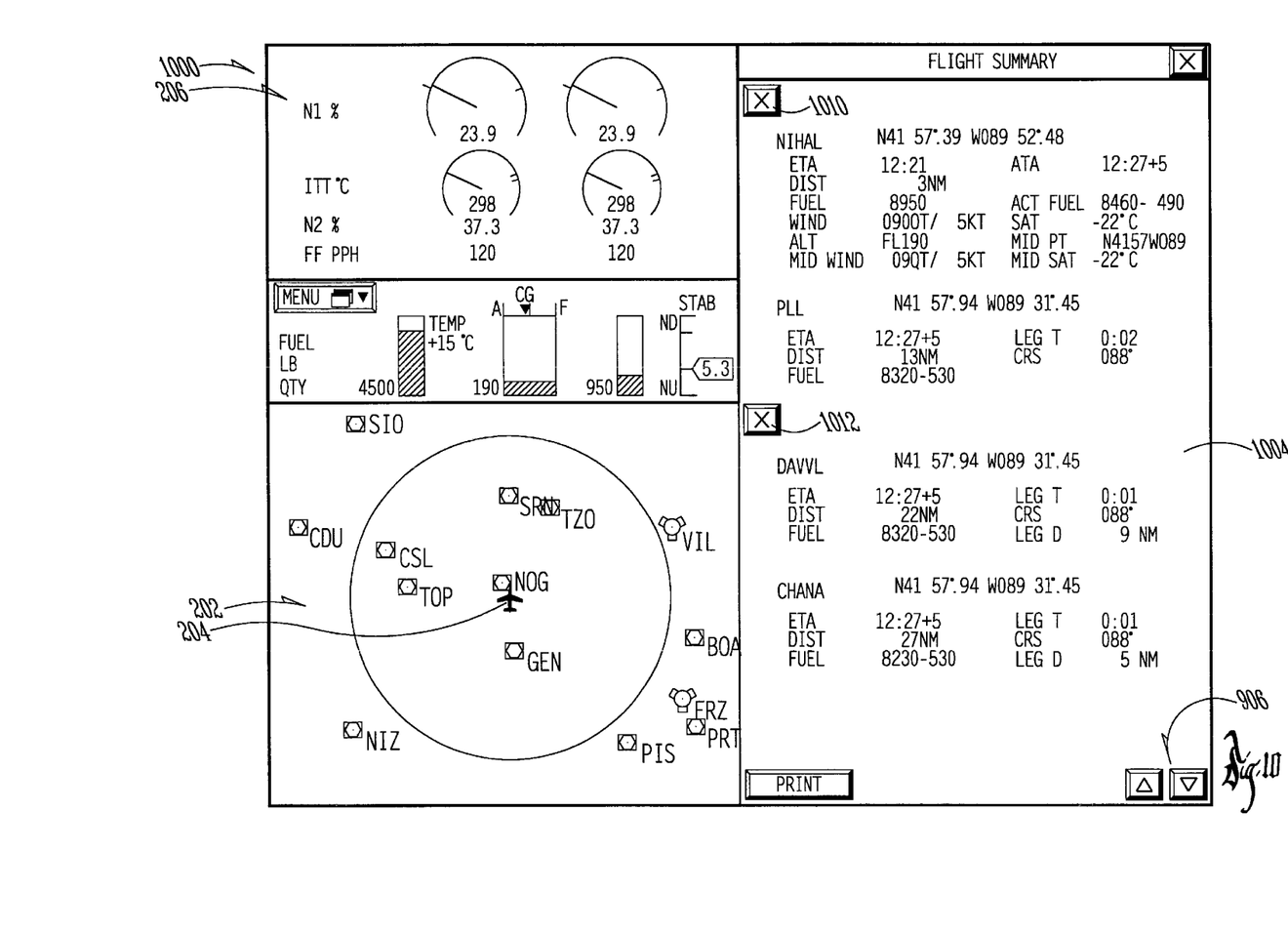
FIG. 10 is a representation of an avionics display of the present invention, showing the display of FIG. 9 after expanding the segment in the lower right-hand corner and automatically closing the segment in the upper right-hand corner.

Now referring to FIG. 10, there is shown a display, generally designated 1000, of FIG. 9 after the FMS flight summary, compressed view, bottom section, manual view expansion button 910 was clicked. This resulted in the automatic closing of FMS initialization status function 504 and the display of additional flight plan legs in window area 1004. Also shown are FMS flight summary full view, top section, manual view compression button 1010 and FMS flight summary full view, bottom section, manual view compression button 1012 for closing out sections of the FMS flight summary function.

Throughout this description, the displays of the present invention have been shown and described as being divided into four fixed-sized equal quadrants. It is believed that such an arrangement may be preferred in certain situations; however, it should also be understood that this fixed-sized quadrant display division scheme is merely exemplary of the many other division schemes (fixed sized segments and non-fixed sized segments) which could be utilized in carrying out the present invention. It is intended that the present invention and the claims below be read and construed to include these many other display division schemes.

Throughout this description, the terms "buttons" and "clicking" have been used. They are selected because they are believed to readily convey the present invention; however, it should be understood that other visual marks other than buttons could be substituted, and actions other than clicking could be substituted as well. The term "instrument function" is used herein to describe the various types of displays which can be displayed in the present invention. "Instrument function" is intended to be read very broadly and to include all avionics navigation, control and communication functions, irrespective of whether they might normally be viewed as an "instrument." For example, FMS functions may not be thought of as an "instrument", but they are included in the present invention as display options and are intended to be included in the present invention and within the term "instrument function." It is intended that the present invention and the claims below be read to include all variations of these concepts.

The hardware and software to create the displays of the present invention are either well known in the art or could be adapted, without undue experimentation, from well-known hardware and software, by persons having ordinary skill in the art, once they have carefully reviewed the description of the present invention included herein.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. An avionics display system comprising:

an electronic flight display for displaying flight information in a landscape orientation said display having display quadrants for displaying the flight information; and a quadrant pop-up menu activated by selecting a display quadrant to select the flight information for display on the electronic flight display wherein said selected flight information is automatically displayed in a two quadrant full view.

2. An avionics display system of claim 1 wherein said quadrant pop-up menu further comprises:

a quadrant pop-up instrument function menu displaying flight information as selectable instrument functions; and a quadrant pop-up detail menu for the quadrant pop-up instrument function menu displaying selectable instrument function details.

3. An avionics display system of claim 2 further comprising an instrument function display selected from the quadrant pop-up instrument function menu and the quadrant pop-up detail menu said instrument function display having predetermined default display features.

4. An avionics display system of claim 3 wherein said instrument function display predetermined default display feature causes said instrument function display to automatically occupy the full view in two quadrants if a quadrant is selected and another quadrant is not displaying an instrument function other than a default instrument function.

5. An avionics display of claim 4 wherein said predetermined default display feature vertically expands and compresses said instrument function display on two quadrants.

6. An avionics display of claim 5 further comprising a manual view compression button for closing down a quadrant of the instrument function display wherein said manual view compression button is located.

7. An avionics display of claim 6 further comprising a compressed view position button for toggling between a compressed view and the full view.

8. An avionics display system of claim 6 further comprising a manual view expansion button for expanding to a full vertical view.

9. An avionics display of claim 4 wherein said predetermined default display feature causes the instrument function display to occupy a single quadrant sized instrument function display and a double quadrant sized instrument function display.

10. An avionics display system of claim 4 further comprising scroll buttons to scroll through a quadrant.

11. An avionics display system comprising:
   means for displaying flight information in a landscape orientation with display quadrants; and
   means for selecting the flight information for display in the display quadrants automatically in a full two quadrant view.

12. An avionics display of claim 11 wherein said means for selecting the flight information for display comprises a quadrant pop-up menu displayed by selecting one of the display quadrants.

13. An avionics display of claim 11 further comprising means for changing the flight information display size from a full view occupying two quadrants to a single quadrant and back to the full view.

14. An avionics display of claim 13 wherein said means for changing is an automatically appearing manual view expansion button.

15. An avionics display of claim 13 wherein said means for changing is an automatically appearing manual view compression button.

16. A method of displaying information to a pilot comprising the steps of:
   displaying flight information on a electronic flight display in a landscape orientation having display quadrants;
   activating a menu disposed in one of said display quadrants in response to a click in one of said display quadrants; and
   displaying said flight information automatically in a full view in two of said display quadrants in response to a menu selection made in said one display quadrant.

17. A method of claim 16 wherein said step of displaying said flight information further comprises changing from the full view in two display quadrants to a single quadrant view in response to a selection of a compressed view, position page button.

18. A method of claim 17 wherein said step of displaying said flight information further comprises changing from the single quadrant view to the full view in response to a compressed view, manual view expansion button.

19. A method of claim 16 wherein said step of displaying said flight information further comprises automatically displaying the flight information in a single quadrant when a second quadrant displays additional flight information.

* * * * *